US006534966B2

United States Patent
Zou

(10) Patent No.: US 6,534,966 B2
(45) Date of Patent: Mar. 18, 2003

(54) METHODS AND APPARATUS FOR POWER MEASURING RECEIVER

(75) Inventor: Min Z. Zou, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 09/853,287

(22) Filed: May 10, 2001

(65) Prior Publication Data

US 2002/0175668 A1 Nov. 28, 2002

(51) Int. Cl.[7] .................. G01R 23/04; G01R 23/14; G01R 23/00; H04B 17/00; H03C 1/62
(52) U.S. Cl. .................. 324/95; 324/76.23; 324/76.51; 455/67.1; 455/67.7; 455/115; 455/226.2
(58) Field of Search .................. 324/95, 76.23, 324/76.51; 455/67.1, 67.7, 115, 226.2

(56) References Cited

U.S. PATENT DOCUMENTS

| | | | | |
|---|---|---|---|---|
| 3,921,169 A | * | 11/1975 | Lazarchik et al. .......... 342/87 |
| 5,740,524 A | * | 4/1998 | Pace et al. .............. 455/232.1 |
| 5,808,463 A | * | 9/1998 | Nagano ................... 324/76.21 |
| 5,818,215 A | * | 10/1998 | Miyamae et al. ........ 324/76.27 |
| 6,198,779 B1 | * | 3/2001 | Taubenheim et al. ....... 375/316 |
| 6,396,344 B1 | * | 5/2002 | Gentzler et al. ............ 330/149 |

* cited by examiner

Primary Examiner—N. Le
Assistant Examiner—Wasseem H. Hamdan
(74) Attorney, Agent, or Firm—Fish & Neave; Andrew Van Court

(57) ABSTRACT

Power measuring receiver (PMR) methods and apparatus for measuring power of signals are provided in which a high frequency measuring circuit (HFMC), a conversion measuring circuit (CMC), and an intermediate frequency measuring circuit (IFMC) work in conjunction with each other to measure a wide power range of signals. The HFMC may measure relatively high power signals at high frequency. The CMC may convert the high frequency signal into an intermediate frequency signal so that both the CMC and the IFMC can accurately measure low power signals. The CMC may also set the minimum noise bandwidth associated with gain stages in the IFMC. The intermediate frequency may provide the IFMC with the ability to perform low power measurements at a reduced DC power consumption.

20 Claims, 5 Drawing Sheets

| Element(s) | Description |
|---|---|
| 220 | High frequency measuring circuitry |
| 240 | Conversion measuring circuitry |
| 260 | Intermediate frequency measuring circuitry |
| 224, 242, 264, 266 | Gain stage |
| 232, 234, 272, 274, 276 | Detector |
| 244 | Mixer |
| 248 | Filter |

| Element (s) | Description |
|---|---|
| 520 | High frequency measuring circuitry |
| 540 | Conversion measuring circuitry |
| 560 | Intermediate frequency measuring circuitry |
| 510 | Start-up circuit |
| 524, 542, 566, 568 | Gain stage |
| 550, 555 | Attenuation stage |
| 532, 534, 536, 538, 572, 574, 576 | Detector |
| 544 | Mixer |
| 546 | Local oscillating signal input |
| 548 | Filter |
| 580 | Buffer |

Legend for FIG. 5

FIG. 6

METHODS AND APPARATUS FOR POWER MEASURING RECEIVER

FIELD OF THE INVENTION

This invention relates to measuring power of signals. More particularly, the present invention relates to methods and apparatus for measuring a wide power range of signals by measuring the input signal at both high and intermediate frequency.

BACKGROUND OF THE INVENTION

Power measuring receivers may be used to measure the power associated with high frequency signals, such as signals found in wireless communication systems. These receivers may measure a finite range of the power associated with the high frequency signal by using, for example, a logarithmic amplifier technique. A power measuring receiver such as a conventional radio frequency (RF) power detector may use multiple gain stages (e.g., amplifiers) and detectors (e.g., signal detectors) to measure the power of the high frequency input signal. However, measurement of power signals in conventional power measuring receivers may be limited by high noise bandwidth in the receiver. At high frequencies, the noise bandwidth may prevent accurate measurement of low power signals. In addition, when these receivers are designed to measure a wide range of power signals, numerous gain stages and detectors may be needed, which can result in high levels of power consumption.

Other power measuring receivers, such as an intermediate frequency power detector, may correct the problem of high noise bandwidth and extensive DC power consumption associated with the conventional power detector. The intermediate power detector may measure the input signal indirectly by converting the frequency of the original input signal (i.e., high frequency signal) to an intermediate frequency signal, which is then provided to detectors for measurement. This receiver may be able to measure the power signal at a relatively low noise bandwidth because noise bandwidth is directly correlated to the frequency (i.e., higher frequency results in more noise). However, the intermediate frequency power detector may not be able to measure high power input signals operating at high frequency (e.g., radio frequency) because the high power saturates the high frequency gain stages. In addition, when low power input signals are measured, the error feedthrough associated with the converting circuitry may prevent the power detector from accurately measuring the power. Thus, these limitations can prevent the intermediate power receiver from measuring a wide range of power.

In view of the foregoing, it would be desirable to provide a power measuring receiver that measures input signal power at a wide dynamic power range with high sensitivity.

It would also be desirable to provide a power measuring receiver that measures input signal power at both a high frequency and an intermediate frequency at low noise bandwidth.

It would also be desirable to provide a power measuring receiver that consumes low quantities of DC power.

SUMMARY OF THE INVENTION

It is therefore an object of the present invention to provide a power measuring receiver that measures input signal power at a wide dynamic power range with high sensitivity.

It is also an object of the present invention to provide a power measuring receiver that measures input signal power at both a high frequency and an intermediate frequency at low noise bandwidth.

It is also an object of the present invention to provide a power measuring receiver that consumes low quantities of DC power.

In accordance with these and other objects of the invention, methods and apparatus for a power measuring receiver that measures input signal power at a wide power range are provided. The power measuring receiver measures a wide range of input signal power by measuring the same input signal at two different frequencies so that an extended measurable power range is obtained while providing accurate detection of input signal power. The power measuring receiver that measures input signal power at two different frequencies may have, in accordance with the present invention, high frequency measuring circuitry, conversion measuring circuitry, and intermediate frequency measuring circuitry, which work in conjunction with each other to measure the power of the signal at both high frequency and intermediate frequency.

High Frequency measuring circuitry may measure relatively strong input power signals by using, for example, a detector or detectors used in combination with signal altering circuits. Signal altering circuits may be included to change the magnitude of the signal so that the signal can be measured by the detectors. Signal altering circuits may be, for example, gain stage circuitry, attenuation stage circuitry, or any other suitable circuitry. High frequency measuring circuitry may provide the power measuring receiver with the high end of the wide range of measurable power.

Conversion measuring circuitry may down-convert the frequency of the input signal from high frequency to intermediate frequency and measure the power of the reduced frequency signal. Conversion measuring circuitry may measure the reduced frequency signal with a detector or a detector used in combination with signal altering circuits. In addition, the conversion measuring circuitry may set the minimum level of noise bandwidth so that the intermediate frequency measuring circuitry and accurately measure the power of the input signal.

Intermediate frequency measuring circuitry may measure relatively low input power signals using, for example, a detector or a detector used in combination with signal altering circuits. These detectors may be able to accurately measure low power signals because they are measuring power of the signal at intermediate frequency and at a low noise bandwidth. Intermediate frequency measuring circuitry may provide the power measuring receiver with the low end of the wide range of measurable power.

Since power measurement of the input signal may occur at intermediate frequency, this can provide the intermediate frequency measuring circuitry with the ability to measure the input signal at a reduced DC power consumption. The lower frequency of the signal results in less power consumption by detectors, signal altering circuits, or any other suitable circuitry provided with the power measuring receiver.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 6 is a descriptive legend that corresponds to elements shown in FIG. 5.

DETAILED DESCRIPTION OF THE INVENTION

Methods and apparatus for measuring the power of signals are provided. In particular, methods and apparatus are provided for measuring a wide power range of signals by measuring the input signal at both high and intermediate frequency.

Figure 1:
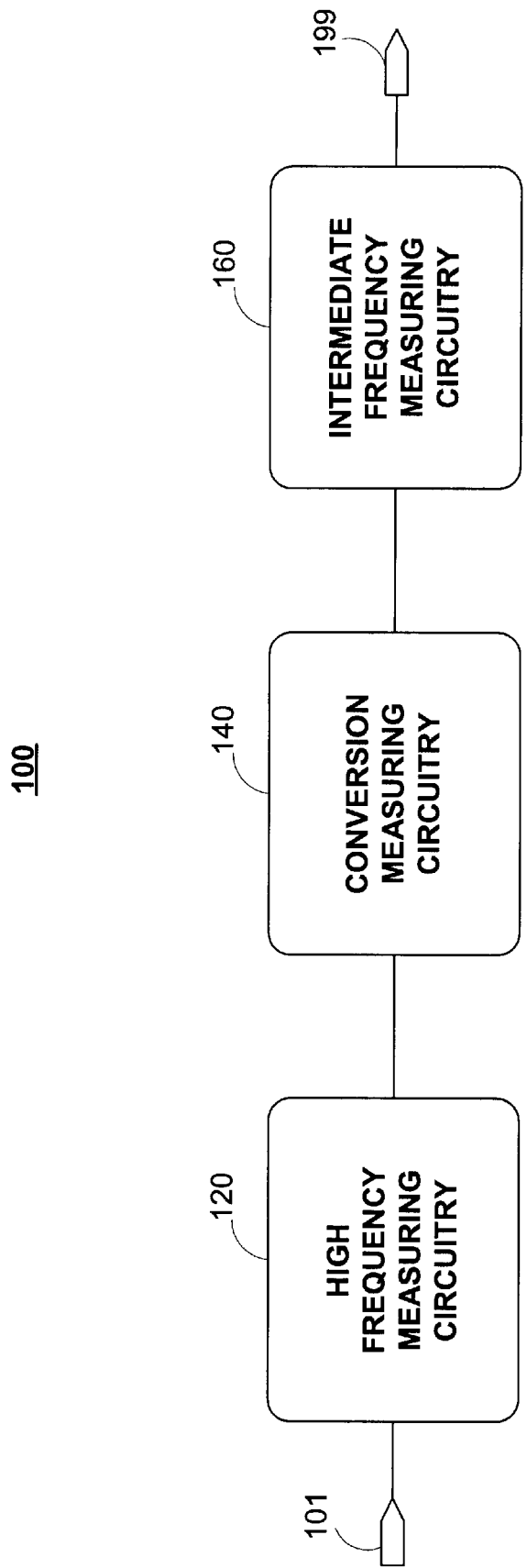
FIG. 1 is a schematic block diagram illustrative of a power measuring receiver in accordance with the principles of the present invention.

FIG. 1 shows a schematic block diagram illustrative of power measuring receiver 100 (PMR 100) in accordance with the present invention. PMR 100 may include high frequency measuring circuitry 120 (HFMC 120), conversion measuring circuitry 140 (CMC 140), intermediate frequency measuring circuitry 160 (IFMC 160), input node 101, and output node 199. HFMC 120, CMC 140, and IFMC 160 may operate in conjunction with each other to provide PMR 100 with a wide range of measurable power. PMR 100 may measure the power of a high frequency signal such as a radio frequency signal, an infra-red signal, a microwave signal, a gamma signal, an ultra-violet signal, a long wave signal, an X-ray signal, a soundwave signal, an electromagnetic signal, or any other suitable signal received at input node 101. According to the principles of the present invention, the power measuring receiver can measure signals operating at any frequency. However, advantages of the present invention can be observed for frequencies of at least 1 MHz.

HFMC 120 may measure relatively high power input signals with significant accuracy, thus providing PMC 100 with a high-end measurable power range.

CMC 140 may down-convert the signal from high frequency to an intermediate frequency (i.e., a signal representing the same magnitude of power, but with a lower frequency) so that CMC 140 and IFMC 160 can measure the power of the signal at a reduced frequency. The reduced frequency may be, for example, one-tenth that of the high frequency signal or any other suitable fraction thereof.

IFMC 160 may measure input signals that have a lower frequency than the input signals measured by HFMC 120, thus providing PMR 100 with a low-end measurable power range. IFMC 160 may measure the input signal at an intermediate frequency to provide an accurate measurement of low power signals.

The power measured by both HFMC 120, CMC 140, and IFMC 160 may be provided as output (e.g., voltage, current, etc.) at output node 199.

Figure 2:
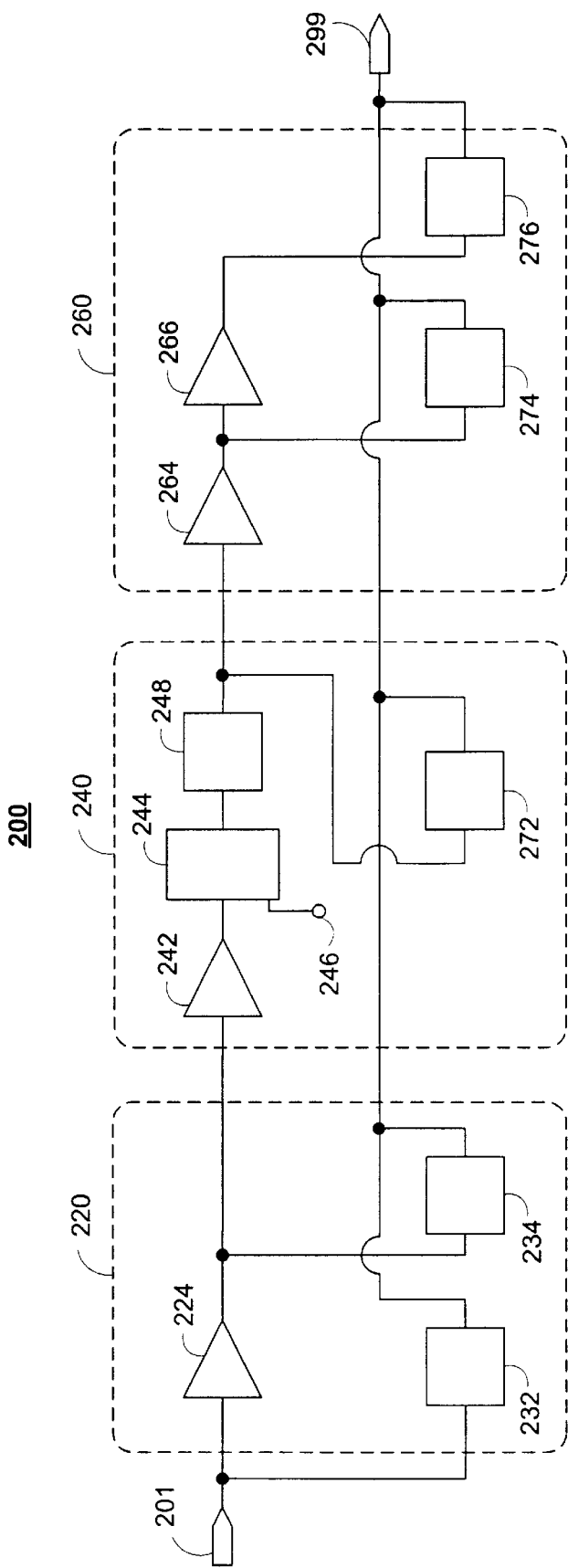
FIG. 2 is a schematic diagram illustrative of a power measuring receiver in accordance with the principles of the present invention.

FIG. 2 shows a schematic diagram illustrative of power measuring receiver 200 (PMR 200) that measures an input signal at high frequency and at intermediate frequency. PMR 200 may include input node 201, high frequency measuring circuitry 220 (HFMC 220), conversion measuring circuitry (CMC 240), intermediate frequency measuring circuitry 260 (IFMC 260), and output node 299.

PMR 200 may be constructed in a number of different ways, but there are some general circuits that should be used with the present invention. For example, detectors may be used to measure the power of the signal. Detectors may be any suitable device such as a full-wave rectifier, a half-wave rectifier, or any other device that can measure the power of signals. Detectors may be arranged in a cascaded layout to provide power measuring receiver 200 with a wide measurable power range.

In addition, signal altering circuits, such as gain stages and attenuation stages may be used in conjunction with the detectors to assist in measuring the input power signal. Signal altering circuits may change the magnitude of the signal so that the signal can be measured by the detectors. Gain stages may be, for example, amplifiers or any other devices suitable for increasing the magnitude of the signal. Attenuation stages, on the other hand, may be, for example, a voltage divider or any other device suitable for decreasing the magnitude of the signal. In the present invention, individual signal altering circuits and detectors may be coupled together to form a combinational pair, which provides PMR 200 with a wide range of measurable power. For example, one such combinational pair may include a detector and a gain stage. In another example, a combinational pair may include a detector and an attenuation stage.

HFMC 220 may include gain stage 224, and cascaded detectors 232 and 234. CMC 240 may include gain stage 242, down-mixer 244, low-pass filter 248, and detector 272. IFMC 120 may include gain stages 264 and 266 and cascaded detectors 274 and 276. Attenuation stages could be added to FIG. 2, but have been omitted to avoid cluttering the schematic.

In PMR 200, the output of each detector (e.g., detectors 232, 234, 272, 274, and 276) may be coupled to output node 299. This way, the measured output of each detector may be summed together in accordance with the principle of superposition. In HFMC 220, input node 201 may be connected to gain stage 224 and detector 232. The output of gain stage 224 may be coupled to both detector 234 and gain stage 242 of CMC 240. The direct connection between gain stage 224 and detector 234 may provide PMR 200 with a combinational pair that measures the power of the signal.

The output of gain stage 242 of CMC 240 may provide the high frequency signal to mixer 244, which converts the high frequency signal into a lower, intermediate frequency signal that may be filtered by lowpass filter 246. Detector 272 may be connected to lowpass filter 246 to measure the power of the intermediate frequency signal. Gain stage 242 and detector 272 may be another combinational pair, except in this case, the frequency of the signal is down converted by mixer 244 to a lower frequency before it is measured by detector 272.

As illustrated in IFMC 260 of FIG. 2, the output of gain stage 264 may be connected to detector 274 and gain stage 266. Likewise, the output of gain stage 266 may be connected to detector 276. IFMC 260 may have two combinational pairs (e.g., gain stage 264 and detector 274, and gain stage 286 and detector 276).

The present invention may use cascaded detectors to provide PMR 200 with a wide range of measurable power ranging, for example, from about 30 dBm to about 120 dBm. However, when detectors are considered on an individual basis (i.e., not cascaded with any other detector), each detector may only measure a finite range of power (e.g., 0 dBm to −10 dBm). The measurable range of each individual detector may be arbitrary, that is one power measuring receiver may have detectors measuring, for example, 2 dBm to −7 dBm on an individual basis and another power measuring receiver may have detectors measuring, for example, 5 dBm to −15 dBm on an individual basis. In addition, if each detector measures a specific power range, each detector may also provide a specific voltage range (e.g., 0.2V to 2V) as output. If each detector provides a finite output, the cascaded output of the detectors may be summed together to provide an extended range of measurable power.

When a cascaded detector arrangement is used, signal altering circuits may be provided to increase or decrease the magnitude of the signal since each detector can only measure a specific range of power. Hence, the combinational pair (e.g., signal altering circuit and a detector) may be provided to assist the detector in measuring the input signal. Signal altering circuits may change the magnitude of the input signal by any specified amount (e.g, 10 dB). In particular, changes to the magnitude of the input power signal by signal altering circuits may be equivalent to the absolute value of the range of the detectors used in PMR 200. For example, if each detector measures power ranging from 0 dBm to −10 dB, the signal altering circuitry may change the magnitude of the input power signal by 10 dB. This can provide consistent changes of the input signal such that various signal altering circuitry can be paired up with detectors as combinational pairs in PMR 200.

The following provides an illustrative example of how the combinational pairs can be used to measure the input signal. If detector 232 is configured to measure power signals ranging from 0 dBm to −10 dbm and detector 234 is configured in the cascaded arrangement to measure power signals ranging from −10 dBm to −20 dBm (even though detectors 232 and 234, when considered on an individual basis, can only measure power ranging from 0 dBm to −10 dBm) and gain stage 224 is configured to amplify the signal 10 dB. Then, when a signal having, for example, a magnitude of −15 dBm is received by PMR 200, the signal may not be measured by detector 232 because the input signal does not fall within the detector's measurable range. The input signal may have to be amplified by gain stage 224 (i.e., change input signal from −15 dBm to −5 dBm) so that detector 234 can measure the input signal. Since gain stage 224 increased the magnitude of the signal by 10 dB, the power signal may be detected by detector 234 because the power now lies between the detector's preset measuring range of 0 dBm to −10 dBm. All other detectors in PMR 200 may become limited (i.e., the detectors' measuring capacity is maxed out) because the strength of the input signal is greater than the measurable power range of those detectors. These limited detectors may then output a maximum value since the power is higher than the detector's measurable range. Therefore, the output provided by power measuring receiver at output node 299 may be the sum total of power measured by detectors 276, 274, 272 and 234.

Limitation of signal altering circuits and their respective detectors may occur when the power of the signal is stronger than that measurable by the detector. Cascaded limitation may occur when one or more combinational pairs become limited. For example, when the power of the signal is greater than that measurable by a combinational pair (e.g., gain stage 266 and detector 276), this particular combinational pair may become limited. Moreover, if the signal has enough power, the next combinational pair (e.g., gain stage 264 and detector 274) may also become limited. Thus limitation may occur for each combinational pair until the power is measured.

If desired, detectors may become limited even if it is not part of a combinational pair. Such detectors may be provided as reference detectors in the power measuring circuit. Reference detectors (e.g., detector 232) may be provided as the pivot point in determining where attenuation stages and gain stages are located in the power measuring receiver. For example, detector 232 may measure power signals ranging between 0 dBm to −10 dBm. When the input power is low (e.g., −70 dBm), combinational pairs having gain stages may be provided downstream from reference detector 232 so that the detectors can measure the low power signals. When the input power is high (e.g., 13 dBm), combinational pairs having attenuation stages may be provided upstream from reference detector 232 so that detectors upstream can detect higher power signals.

Figure 3:
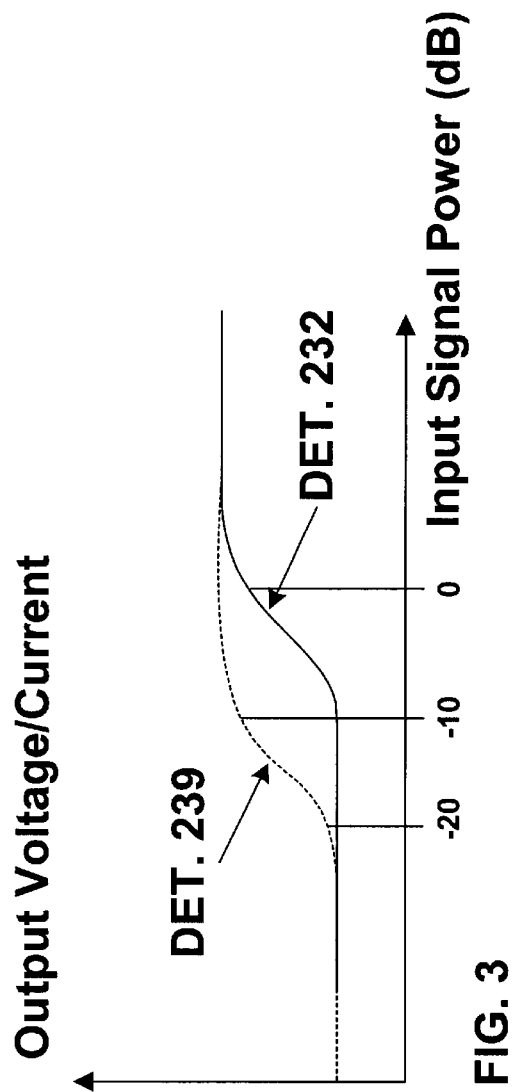
FIG 3 is a general illustration of the characteristics of detectors, when considered individually in accordance with the principles of the present invention.
Figure 4:
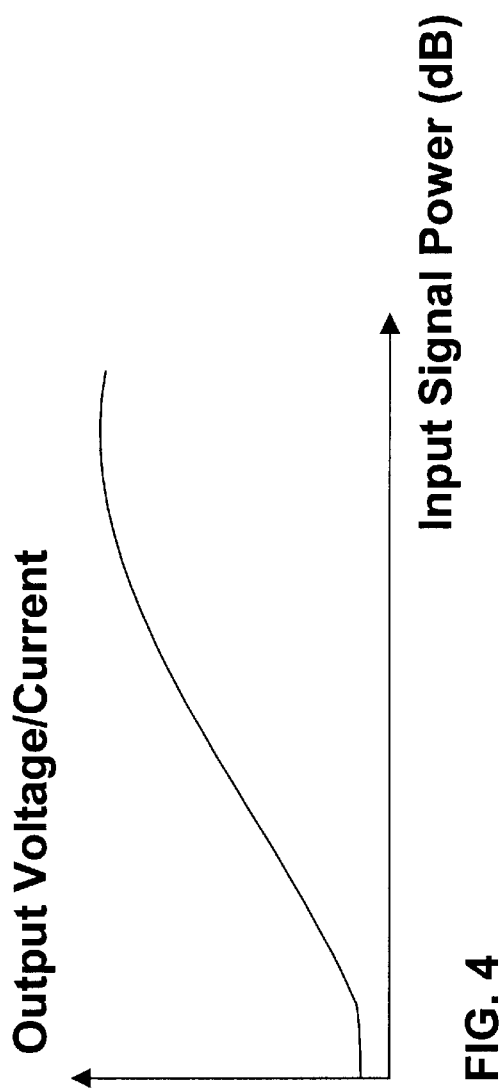
FIG. 4 is a general illustration of the output of cascaded detectors in accordance with the principles of the present invention.

FIGS. 3 and 4 are provided to explain how cascaded detectors can be implemented to measure a wide range of input power. FIG. 3 shows an illustrative graph that has two S-shaped curves representing, for example, the cascaded measurement range of detectors 232 and 234, both having the same output range. The S-curve represented by detector 232 may, for example, measure power ranging from 0 dBm to −10 dBm and the S-curve represented by detector 234 may measure power ranging from −10 dBm to −20 dBm. FIG. 4 shows an illustrative graph that has one S-shaped curve that may represent the output of the combined summation of cascaded detectors 232 and 234. Hence, the operation of gain stage 224 and detectors 232 and 234 results in a linear relationship between the input signal power and the output. The S-curve in FIG. 4 illustrates how PMR 200 can measure a wide range of input power while providing an output corresponding to the measured power. Even though the gain stage and detectors in HFMC 220 were used for the discussion with FIGS. 3 and 4, the discussion may also apply to CMC 240 and IFMC 260. The linear relationship may exist for all the detectors in PMR 200.

The following examples explain different PMR 200 operations for measuring different power levels in context with maintaining relatively low noise bandwidth. Maintaining low noise bandwidth may be important for providing PMR 200 with the ability to accurately measure low power signals. In particular, PMR 200 may measure both high power and low power signals accurately by maintaining low noise bandwidth. For the examples herein referring to PMR 200, the following numbers illustrate example operating parameters for the receiver. Each gain stage in PMR 200 increases the input power magnitude by 10 dB. The measurable power range of detectors 232, 234, 272, 274, and 276 are −20 dBm to −30 dBm, −40 dBm to −50 dBm, −50 dBm to −60 dBm, −60 dBm to −70 dBm, and −70 dBm to −80 dBm respectively, where each detector individually measures between −30 dBm and −40 dBm.

In one example, the input power signal may have a magnitude of −67 dBm. According to the illustrative parameters set above, detector 274 should provide the final power measurement to output node 299. Once the signal is received, gain stage 224 may amplify the signal to −57 dBm. Gain stage 224 may undergo minimal limitation since gain stage 224 requires a high power signal to undergo full limitation. Once the signal is amplified by gain stage 224, the signal may then be amplified by gain stage 242 in CMC 240 (to a signal with a −47 dBm magnitude) and then down-converted to an intermediate frequency signal by mixer 244.

Mixer 244 down-converts the input signal to an intermediate frequency signal depending upon local oscillating signal 246. For example, if the input power frequency is 2 GHz and the local oscillating signal 246 is 1.8 GHz, the resulting intermediate frequency power signal may be 200

MHz. The magnitude of the signal should be significantly higher than the magnitude of the local oscillating signal to prevent desensitization of the detectors in IFMC 260. Any potential problems associated with desensitization can be avoided because of the high gain of gain stages in HFMC 220, which passes higher power signals to down-mixer 244. The intermediate frequency signal may provide CMC 240 and IFMC 260 with a foundation for indirectly measuring the high frequency power signal. Within this foundation, accurate measurement of low power signals may be provided because the noise associated with the gain stages (e.g., gain stages 274 and 276) may be much lower than the noise associated with gain stages operating at high frequency signals. Therefore, the overall noise bandwidth associated with the combined operation of the gain stages may be relatively low, thus providing an accurate measurement of lower power signals. Once mixer 244 converts the input signal to an intermediate frequency, filter 248 (i.e., lowpass filter, bandpass filter, or any other suitable filter) attenuates unwanted components (e.g., 3rd, 5th, order harmonics and other unwanted mixing products) associated with the conversion of input power signal to an intermediate frequency power signal. Filter 248 may set the minimum level of noise bandwidth for IFMC 260 after the signal is converted to the intermediate frequency signal. Setting a minimum noise bandwidth may be necessary because the noise bandwidth associated with the gain stages in IFMC 260 may increase as the signal propagates through IFMC 260.

Once the input signal has been down-converted to intermediate frequency, detector 272 may measure the signal. In this case, the signal is still too weak to be detected by detector 272. The output of CMC 240 (e.g., filter 248) may also be amplified by gain stage 264 to a signal having a magnitude of −37 dBm. Gain stage 266 may undergo a full limitation because the signal is too strong to be further amplified. Thus, detector 276 may also undergo a full limitation and provide a maximum output value to output node 299. Detector 274, however, may be partially limited and provide an output associated with the input power signal. The combined total of the outputs provided by detectors 274 and 276 may provide an accurate power measurement of the signal received by PMR 200.

The present invention may be capable of accurately measuring low power signals because these signals are measured at an intermediate frequency, not at the original high frequency. Detectors that measure signals at the original high frequency may by limited by the noise floor as shown by the following equation:

$$N_{DET}=-173.8+10*\log\ (A*BW_{HF})+NF_{HF}\text{(dBm)} \quad (1)$$

where $BW_{HF}$ is the 3 dB gain bandwidth of the cascaded gain stages. $NF_{HF}$ is the input-referred noise of the cascaded gain stages and A is the correction factor for the noise bandwidth that exists between:

$$1<A<\pi/2 \quad (2)$$

The noise floor may limit the detector's sensitivity in accurately measuring the power signal. In practice, the noise bandwidth associated with the measurement of high power signals may not have any impact on the accuracy of the measurement because the signal has enough power associated with it to overcome any potential noise bandwidth problems. However, when the input signal has relatively low power, the noise bandwidth at high frequency may be large enough to hamper accurate measurement of the low power signal. The present invention down-converts the high frequency signal to an intermediate frequency power signal so that the detectors can measure the same signal, but at a lower frequency. The lower frequency may improve the detectors sensitivity by a factor of:

$$10*\log\left(\frac{BW_{HF}}{BW_{IF}}\right) \quad (3)$$

Where $BW_{IF}$ is the 3 dB gain bandwidth of gain stages operating at intermediate frequency. Thus, the noise bandwidth of intermediate frequency detectors can be:

$$N_{DET}=-173.8+10*\log\ (A*BW_{IF})+NF_{HF}\text{(dBm)} \quad (4)$$

Since the original high frequency signal can be down-converted to an intermediate frequency signal, PMR 200 can accurately measure low power signals because the noise floor associated with each detector is significantly lower at intermediate frequency than at high frequency.

Intermediate frequency signals provide the power measuring receiver with the ability to measure the signal at a reduced DC power consumption. In particular, reduced power consumption can be provided for the intermediate frequency measuring circuitry. The lower frequency may put less demand on signal altering circuits and detectors during measurement, therefore, resulting in less power consumption.

Figure 5:
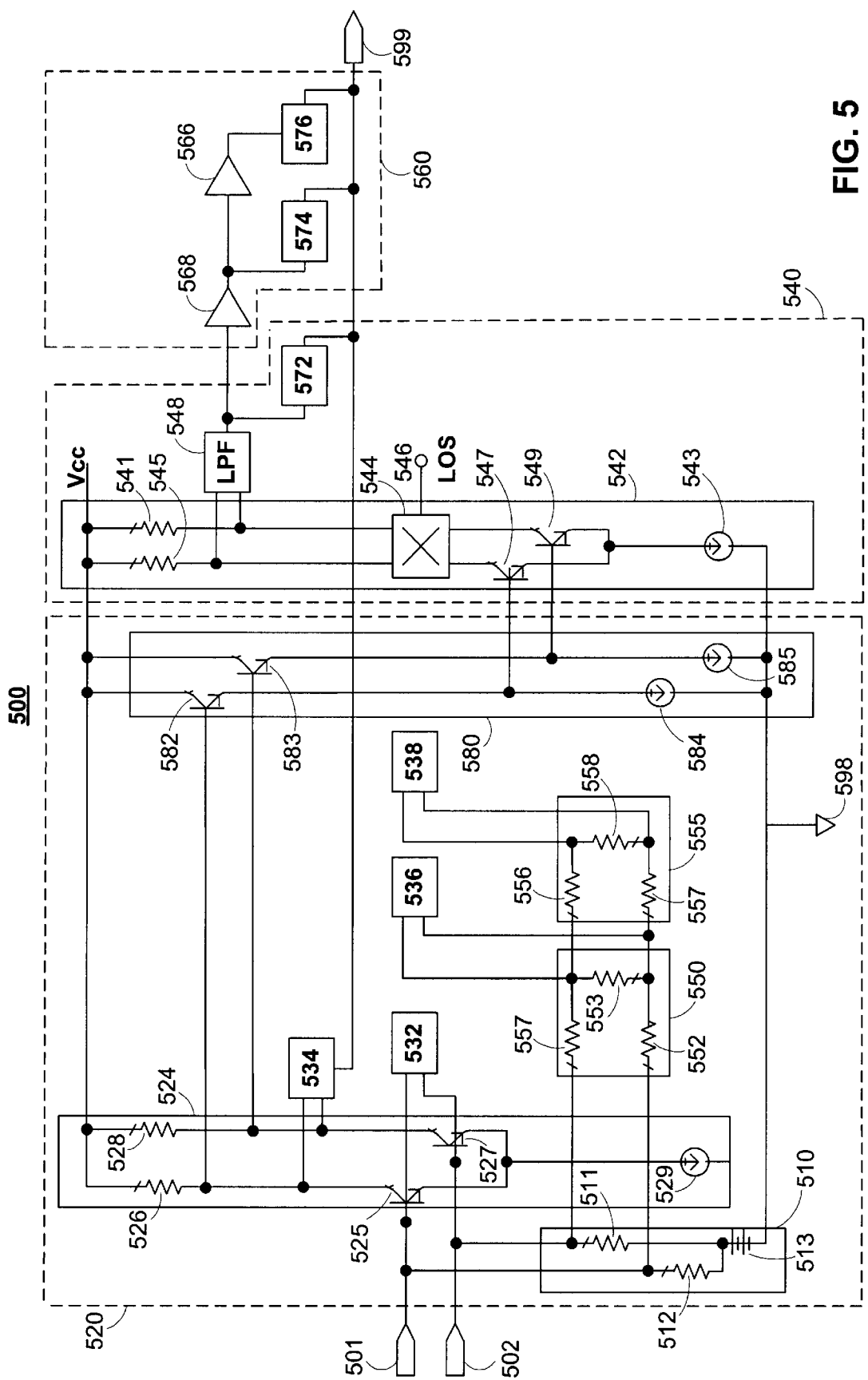
FIG. 5 is another schematic diagram illustrative of a power measuring receiver in accordance with the principles of the present invention.

FIG. 5 shows a schematic diagram illustrative of power measuring receiver 500 (PMR 500). In particular, FIG. 5 shows a detailed illustration of high frequency measuring circuitry 520 (HFMC 520) and conversion measuring circuitry 540 (CMC 540). In some respects, the components in FIG. 5 can be correlated to components in FIG. 2 to avoid unnecessary duplication of component details. Input nodes 501 and 502 provide power measuring receiver 500 with the input signal for measurement. Two input nodes may be provided so that PMR 500 can measure the differential input signal. HFMC 520, CMC 540 and intermediate frequency measuring circuitry 560 (IFMC 560) may each have Vcc voltage source 597 for providing power and ground 598 for providing a signal ground for PMR 500. Vcc voltage source 597 is not shown to be connected to IFMC 560 to avoid cluttering the FIG. HFMC 520 may include gain stage 524, start-up circuit 510, buffer 580, attenuation stages 550 and 555, and detectors 532, 534, 536, and 538. CMC 540 may be coupled to HFMC 520 and IFMC 560 as shown in the FIG. IFMC 560 may include gain stages 564 and 566, and detectors 574 and 576.

Similar to FIG. 2, input nodes 501 and 502 may be connected to gain stage 524, detector 532, and attenuation stage 550 of HFMC 520. Gain stage 524 may include resistors 526 and 528, transistors 525 and 527, and current source 529. Resistors 526 and 528 may be, for example, collector resistors of transistors 525 and 527, respectively. The transistors may be, for example, bipolar junction transistors, but are not limited to this type of transistor. Persons skilled in the art will appreciate that transistor circuitry can be changed to include a variety of different types of transistors (e.g., field effect transistors). The gain of gain stage 524 may be set by current source 529 (e.g., a gain of 10 dB).

During initial startup of PMR 500, the first gain stage (e.g., gain stage 524) may need to have its transistors (e.g., 525 and 527) biased to the "on-state" to ensure operation of PMR 500. Startup circuitry 510 may provide PMR 500 with the circuitry to bias the transistors in gain stage 524. Startup circuitry may include resistors 511 and 512 and voltage source 513.

The input nodes are connected to detector 532, which can also be referred to as the reference detector of PMR 500. The reference detector as described above, may be the pivot point of PMR 500 that determines how input signals are measured. For example, strong signals may limit gain stages (564, 566, and 524) and detectors (532, 534, 572, 574, and 576) downstream from the reference detector and thus may be measured by detector 536 or 538 or both.

Attenuation stages 550 and 555 may be, for example, resistor voltage dividers that lower the magnitude of the input power signal so that detectors 536 and 538 can measure the input signal.

Gain stage 524 amplifies the input signal if it is too weak to be detected or becomes limited if the signal is too strong. The output of gain stage 524 connects to both detector 534 (to form a gain stage/detector pair) and to buffer 580. Buffer 580 may mirror the output of gain stage 524 to converter circuitry 540 by providing transistors 582 and 583, which provide unity gain by constant current sources 584 and 585, respectively.

CMC 540 may include mixer 544 for down converting the frequency of the input signal to an intermediate frequency signal, gain stage 542, lowpass filter 548, and detector 572. Gain stage 542 can include resistors 541 and 545, transistors 547 and 549, constant current source 543, and mixer 544. Mixer 544 may have a local oscillating signal input 546 for providing a reference to down-convert the high frequency signal to an intermediate frequency signal. The gain stage components may operate in the same manner as described for gain stage 224. Likewise, the gain stage in CMC 540 may amplify the signal or become limited depending upon the strength of the signal. Lowpass filter 548 may attenuate unwanted components by passing the first harmonic of the down-converted signal to detector 572 and IFMC 560. Lowpass filter 548 may be provided because the down-converting process produces numerous harmonics and other unwanted mixing products as the desired intermediate frequency signal is generated. Filter 548 may also set the minimum noise bandwidth for the gain stages of IFMC 560.

IFMC 560 may provide PMR 500 with accurate low power signal measurement by including gain stages 564 and 566 and detectors 574 and 576. The operation of IFMC 560 has been described above.

The output of each detector may be summed together to provide a linear output at node 599 of the measured power.

Attenuation may occur in attenuation stages 550 and 555. Attenuation stage 550 includes resistors 551 and 552 both of which are connected in series with differential input signals 501 and 502 respectively. Resistor 553 provides a means for detector 536 to measure the signal and is connected in parallel to resistors 551 and 552. Attenuation stage 555 includes resistors 556 and 557 both of which are connected in series with resistors 551 and 552. Resistor 558 provides a means for detector 538 to measure the signal and is connected in parallel to resistors 556 and 557.

The following example may illustrate how attenuation stages operate in PMR 500 to provide a wide extended range of measurable input power signals. Assume that PMR 500 has been designed so that cascaded detectors 532, 536, and 538 are capable of measuring 0 dBm to −10 dBm, 10 dBm to 0 dBm, and 20 dBm to 10 dBm, respectively. On an individual basis, each detector may, for example, measure signals ranging between 0 dBm and −10 dBm.

Each attenuation stage may, for example, decrease the magnitude of the signal by 10 dB. If the input power received by input nodes 501 and 502 has a power of 15 dBm, then the gain stages and detectors downstream from gain stage 524 and detector 532 may undergo full limitation, therefore attenuation stages 550 and 555 in conjunction with their respective detectors (i.e., 536 and 538) may be provided to measure the signal. Attenuation stage 550 may decrease the input signal to 5 dBm but detector 536 becomes limited because the signal is still too strong to be detected. However, after attenuation stage 555 decreases the input signal magnitude to −5 dBm, detector 538 may measure the signal (i.e., it does not become limited) because the magnitude of the input signal has changed to a magnitude detectable by the detector (i.e., between 0 dBm and −10 dBm). Hence, PMR 500 can provide accurate output for a wide range of input power.

While the principles of the present invention have illustrated the use of a finite number of signal altering circuits and detectors for measuring a high frequency signal, persons skilled in the art will appreciate that the principles may be equally applied by using any number of signal altering circuits and detectors for measuring a signal at high and intermediate frequency. Thus, persons skilled in the art will appreciate that the principles of the present invention can be practiced by other than the described embodiments, which are presented for purpose of illustration and not of limitation, and the present invention is limited only by the claims which follow.

What is claimed is:

1. A method for measuring power of a signal having a high frequency, said method comprising:

measuring power of said signal with high frequency measuring circuitry;

converting said high frequency of said signal to an intermediate frequency with conversion measuring circuitry, wherein power of said signal having said intermediate frequency is measured by conversion measuring circuitry and intermediate frequency measuring circuitry at relatively low noise bandwidth; and outputting an output based on power measured by said high frequency measuring circuitry, said conversion measuring circuitry, and said intermediate frequency measuring circuitry.

2. The method of claim 1, wherein said measuring power of said signal comprises:

detecting said signal with a plurality of cascaded detectors.

3. The method of claim 1, wherein said measuring power of said signal comprises:

altering said signal such that at least one detector detects said power signal.

4. The method of claim 1, wherein said converting comprises:

reducing said high frequency of said signal with a mixer, said mixer down-converts said high frequency to said intermediate frequency based on a local oscillating signal.

5. The method of claim 1, wherein said converting further comprises:

setting a minimum level of noise bandwidth, wherein said minimum noise bandwidth is set by a lowpass filter.

6. The method of claim 1, wherein said converting further comprises:

attenuating unwanted mixing products with said filter.

7. A power measuring receiver that measures power of a signal having a high frequency, said receiver comprising:

high frequency measuring circuitry that receives said signal at an input node, said high frequency measuring circuitry having at least a first detector to measure said signal, wherein said at least a first detector is coupled to an output node;

conversion measuring circuitry that receives said signal from said high frequency measuring circuitry, said conversion measuring circuitry having a mixer, wherein said mixer down-converts said signal from said high, frequency to an intermediate frequency, said conversion measuring circuitry having at least a second detector that is coupled to said output node; and intermediate frequency measuring circuitry that receives said signal at said intermediate frequency from said conversion measuring circuitry, said intermediate frequency measuring circuitry having at least a third detector that is coupled to said output node.

8. The power measuring receiver of claim 7, further comprising:

at least one signal altering circuit.

9. The power measuring receiver of claim 8, wherein said at least one signal altering circuit comprises:

a gain stage that amplifies magnitude of said signal.

10. The power measuring receiver of claim 8, wherein said at least one signal altering circuit comprises:

an attenuation stage that decreases magnitude of said signal.

11. The power measuring receiver of claim 8, wherein at least one of said first, second, and third detectors is coupled to one of said at least one signal altering circuit.

12. The power measuring receiver of claim 8, wherein said at least one signal altering circuit comprises:

at least two signal altering circuits that are cascaded.

13. The power measuring receiver of claim 7, wherein said mixer comprises:

a local oscillating node for receiving a local oscillating signal that provides basis for down-converting said signal at said high frequency to said intermediate frequency.

14. The power measuring receiver of claim 7, wherein said conversion measuring circuitry comprises:

a low-pass filter coupled to said mixer.

15. The power measuring receiver of claim 7, wherein said high frequency comprises a frequency of at least 1 hertz.

16. The power measuring receiver of claim 7, wherein said high frequency comprises a frequency ranging from about 1 megahertz to about 1000 gigahertz.

17. The power measuring receiver of claim 7, wherein said intermediate frequency comprises a frequency substantially lower than said high frequency.

18. The power measuring receiver of claim 7, wherein said first detector comprises:

a rectifier.

19. The power measuring receiver of claim 7, wherein said second detector comprises:

a rectifier.

20. The power measuring receiver of claim 7, wherein said third detector comprises:

a rectifier.

* * * * *